US011123819B2

(12) United States Patent
Karlen et al.

(10) Patent No.: US 11,123,819 B2
(45) Date of Patent: Sep. 21, 2021

(54) ADDITIVE MANUFACTURING METHOD

(71) Applicant: Hamilton Sundstrand Corporation, Charlotte, NC (US)

(72) Inventors: Eric W. Karlen, Rockford, IL (US); William Louis Wentland, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 367 days.

(21) Appl. No.: 15/714,490

(22) Filed: Sep. 25, 2017

(65) Prior Publication Data
US 2019/0091804 A1    Mar. 28, 2019

(51) Int. Cl.
B23K 26/342   (2014.01)
B33Y 10/00    (2015.01)
(Continued)

(52) U.S. Cl.
CPC .............. *B23K 26/342* (2015.10); *B22F 3/15* (2013.01); *B22F 10/20* (2021.01); *B23K 26/0093* (2013.01); *B23K 26/082* (2015.10); *B23K 26/144* (2015.10); *B29C 64/153* (2017.08); *B29C 64/188* (2017.08); *B29C 64/209* (2017.08); *B33Y 10/00* (2014.12); *B33Y 40/00* (2014.12); *B33Y 50/02* (2014.12); *B22F 3/004* (2013.01); *B22F 7/06* (2013.01); *B22F 10/30* (2021.01); *B22F 2003/244* (2013.01);
(Continued)

(58) Field of Classification Search
CPC .... B23K 26/34; B23K 26/342; B23K 26/082; B23K 26/0626; B23K 26/144; B23K 26/0093; B23K 26/08; B23K 26/0665

USPC .................. 219/76.14, 76.1, 76.12; 264/497; 425/174.4
See application file for complete search history.

(56) References Cited

U.S. PATENT DOCUMENTS 9,039,917 B2   5/2015   Szuromi et al.
9,175,568 B2   11/2015  Ryan
(Continued)

FOREIGN PATENT DOCUMENTS

DE   102014112509 A1   3/2016
EP        3165305 A1    5/2017
(Continued)

OTHER PUBLICATIONS

Non-Patent Literature to Farinia Group "What is Additive Layer Manufacturing (ALM)?" (Year: 2015).*
Wayback Machine to Farinia Group "What is Additive Layer Manufacturing (ALM)?" (Year: 2015).*
European Search Report from the European Patent Office for EP Application No. 18196310.9 dated Feb. 21, 2019, 10 pages.

*Primary Examiner* — Phuong T Nguyen
*Assistant Examiner* — Bonita Khlok
(74) *Attorney, Agent, or Firm* — Cantor Colburn LLP

(57) ABSTRACT

A method of making an article is disclosed. According to the method, an energy beam is directed to a build location on a substrate, and a first powder material is delivered to the build location on the substrate and melted with the energy beam. A second powder material is delivered to the build location on the substrate over the first material and melted with the energy beam. The direction of the energy beam and delivery and melting of the first and second powders is repeated at multiple build locations on the substrate to form a solid surface of the article of the second material. The solid surface comprising the second material is subjected to a finishing process.

8 Claims, 2 Drawing Sheets

(51) Int. Cl.
  *B23K 26/144* (2014.01)
  *B23K 26/00* (2014.01)
  *B23K 26/082* (2014.01)
  *B33Y 40/00* (2020.01)
  *B22F 3/15* (2006.01)
  *B29C 64/188* (2017.01)
  *B29C 64/153* (2017.01)
  *B33Y 50/02* (2015.01)
  *B29C 64/209* (2017.01)
  *B22F 10/20* (2021.01)
  *B22F 7/06* (2006.01)
  *B22F 7/04* (2006.01)
  *B22F 3/24* (2006.01)
  *B22F 3/00* (2021.01)
  *B22F 10/30* (2021.01)

(52) U.S. Cl.
  CPC ... *B22F 2003/247* (2013.01); *B22F 2007/042* (2013.01); *B22F 2998/10* (2013.01); *B22F 2999/00* (2013.01)

(56) References Cited

U.S. PATENT DOCUMENTS

| | | |
|---|---|---|
| 2012/0273229 A1 | 11/2012 | Xu et al. |
| 2014/0015172 A1* | 1/2014 | Sidhu .................... B29C 64/141 264/497 |
| 2017/0014909 A1 | 1/2017 | Tanaka et al. |
| 2017/0129060 A1* | 5/2017 | Szuromi ............... F01D 5/288 |
| 2017/0209958 A1 | 7/2017 | Soshi |
| 2017/0304946 A1* | 10/2017 | Shibazaki .............. B33Y 10/00 |

FOREIGN PATENT DOCUMENTS

| | | |
|---|---|---|
| EP | 3210699 A1 | 8/2017 |
| EP | 3219412 A1 | 9/2017 |
| JP | 10226803 * | 8/1998 |
| JP | H10226803 A | 8/1998 |
| WO | 2017029276 A1 | 2/2017 |
| WO | WO-2017029276 A1 * | 2/2017 ............ B22F 3/1055 |

* cited by examiner

ADDITIVE MANUFACTURING METHOD

BACKGROUND

The described subject matter relates generally to the field of surface finishing, and in particular to additive manufacturing of articles with finished surfaces.

Additive manufacturing refers to a category of manufacturing methods characterized by the fact that the finished part is created by layer-wise construction of a plurality of thin sheets of material. Additive manufacturing may involve applying liquid or powder material to a work-stage, then doing some combination of sintering, curing, melting, and/or cutting to create a layer. The process is repeated up to several thousand times to construct the desired finished component or article.

Many additive manufacturing processes utilize a scanning energy beam to fuse a fusible material, for example to melt and solidify a metal or metal alloy powder to form a solid material. The melting and solidifying of a fusible material such as a metal powder can form roughness at the surface of the solid material, which can have undesirable effects for various applications (e.g., e.g., turbulent fluid flow along rough surfaces) or can be aesthetically or otherwise undesirable. Other artifacts of the additive manufacturing process such as scanning lines or scanning section seams can also contribute to undesirable surface roughness.

BRIEF DESCRIPTION

Disclosed is a method of making an article. The method comprises directing an energy beam to a build location on a substrate, and delivering a first powder material to the build location on the substrate and melting it with the energy beam. A second powder material is delivered to the build location on the substrate over the first material and melted with the energy beam. The direction of the energy beam and delivery and melting of the first and second powders is repeated at multiple build locations on the substrate to form a solid surface of the article comprising the second material. The solid surface comprising the second material is subjected to a finishing process.

In some embodiments, the method can further comprise simultaneously delivering the first and second powder materials to the build location.

In any one or combination of above embodiments, the method can further comprise scanning the laser beam in a scan direction across the substrate, delivering the first powder material through a first nozzle disposed proximate to the energy beam toward a leading side with respect to the scan direction, and delivering the second powder material through a second nozzle disposed proximate to the energy beam toward a trailing side with respect to the scan direction.

In any one or combination of the above embodiments, the method can further comprise delivering the first and second powder materials to the build location in staggered or overlapping pulses.

In any one or combination of embodiments, the first and second powder materials can each independently comprise a metal or metal alloys.

In any one or combination of embodiments, the finishing process can comprise chemical polishing of the solid surface comprising the second material.

In any one or combination of embodiments, the finishing process can comprise electropolishing of the solid surface comprising the second material.

In any one or combination of embodiments, the finishing process can comprise mechanically polishing the solid surface comprising the second material.

In any one or combination of embodiments, wherein the second material can provide a targeted response to the finishing process, compared to the first material.

In any one or combination of embodiments, the second material can provide lower surface roughness in response to the finishing process, compared to the first material.

In any one or combination of embodiments, the finishing process can comprise acid etching and the second material can comprise copper.

In any one or combination of embodiments, the finishing process can comprise mechanical polishing, and the second material has a greater hardness than the first material.

In any one or combination of embodiments, the finishing process can comprise subjecting the solid surface to heat and isostatic pressure.

In any one or combination of embodiments, the method can further comprise inputting a digital model of the article into an additive manufacturing apparatus or system comprising an emitter for the energy beam and first and second powder delivery nozzles disposed proximate to the emitter, and forming the article by repeatedly applying energy from the energy beam to fuse successively applied incremental quantities of the first and second powder materials.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
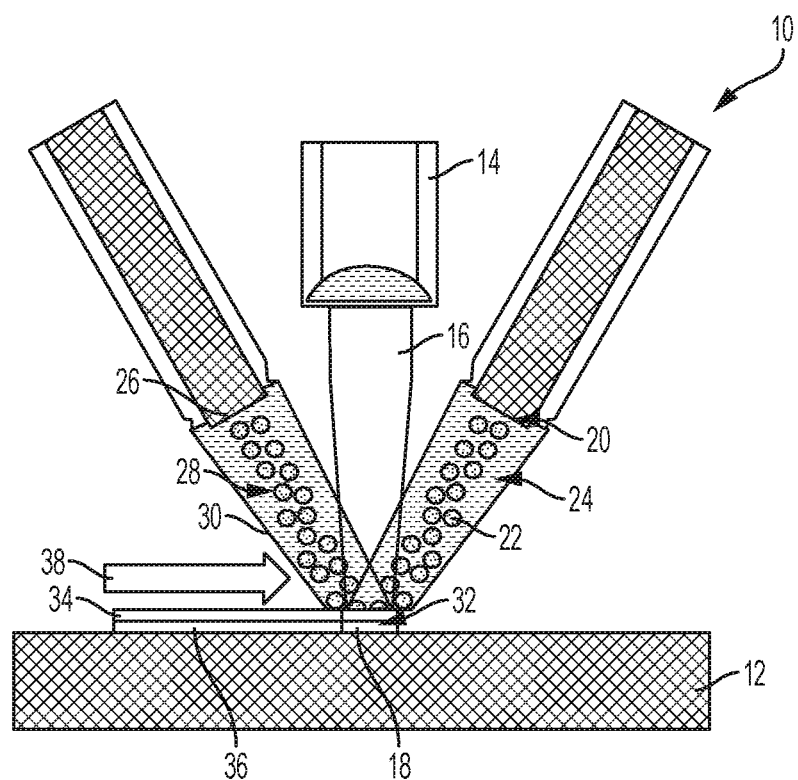
FIG. 1 is a schematic drawing of an energy beam and first and second powder materials being directed to a substrate.

With reference to FIG. 1, an apparatus 10 and substrate 12 are schematically shown in an operational state in which an energy beam and first and second powder materials are directed to the substrate. As shown in FIG. 1, an energy beam emitter 14 directs an energy beam 16 to a build location 18 at the surface of the substrate 12. The energy beam can be any source of focused energy such as a laser beam. A first powder dispensing nozzle 20 directs a stream of particles 22 from a source (not shown) of a first powder material to the build location 18. The particles 22 are propelled in a gas from a gas source (not shown). In some embodiments, the gas can be an inert gas such as argon or nitrogen. In some embodiments, the nozzle can direct a stream of inert gas 24 interposed between the stream of particles 22 and the surrounding atmosphere (i.e., a sheath gas). In some embodiments, the entire work space can be maintained under an inert atmosphere. A second powder dispensing nozzle 26 directs a stream of particles 28 from a source (not shown) of a second powder material to the build location 18. The particles 22 are propelled in a gas from the same gas source or a different gas source than the first nozzle. In some embodiments, the nozzle can direct a stream of inert gas 30 interposed between the stream of particles 28 and the surrounding atmosphere (i.e., a sheath gas).

As further shown in FIG. 1, in operation the energy beam 16 and the first and second powder particle streams 22/28 are directed to the build location 18 on the substrate 12, where the particles are deposited and melted onto the substrate 12 in melt zone 32. The energy beam emitter 14 and the nozzles 20/26 and associated powder feed and gas sources can be operatively connected to a controller (not shown) such as an electronic control unit (ECU), microprocessor, or other controller, which can operate the devices to deposit the second material 34 over the first material 36, as shown in FIG. 1. In some embodiments, this can be accomplished by delivering the first powder material through a nozzle such as nozzle 20 disposed on a leading side with respect to the scanning direction of the energy beam 16 (scanning direction represented by arrow 38), and the second material through a nozzle such as nozzle 26 disposed on a trailing side with respect to the scanning direction represented by arrow 38. In some embodiments, the first and second powder materials can be delivered simultaneously, for example with the leading and trailing side embodiment discussed above. In some embodiments, the first and second powder materials can be delivered continuously during operation of the energy beam. In some embodiments, the first and second powder materials can be delivered in pulses, which can be staggered, partially overlapping, or completely overlapping. In some embodiments, pulsed deliveries can be timed with movement or aiming of the nozzles so to facilitate deposition of the second material over the first material.

Various types of materials can be used as the first and second powder materials, including thermoplastic polymer powders and metal powders. Examples of thermoplastic polymers for powders include polyethylene, polypropylene, polyesters, polystyrenes, polycarbonates. Examples of fusible metal powders include steel, aluminum, copper, nickel, titanium, and alloys, solid solutions or other mixtures comprising any of the foregoing. In some embodiments, powder particle sizes can be in a range having a low end of 5 µm, 10 µm, or 15 µm, and an upper end of 45 µm, 75 µm, or 125 µm. These range endpoints can be independently combined to form a number of different ranges, and each possible range from combination of the range endpoints is hereby disclosed. It should be noted that apparatus and techniques disclosed herein can be adapted particles sizes outside these ranges.

As mentioned above, a solid surface of the second material (e.g., 34, FIG. 1) is subjected to a finishing process. Various types of surface finishing processes can be used, including but not limited to chemical polishing, electropolishing, mechanical polishing, heat treatment, pressure treatment, or heat and pressure treatment. Chemical polishing can be performed with compounds and compositions that chemically react with the second material or in which the second material is at least partially soluble. Metals can be chemically polished (i.e., etched) with acids such as nitric acid, phosphoric acid, sulfuric acid, sodium hydroxide, ferric chloride, or any appropriate mixture or solution or etchant thereof to enhance the selective removal of the secondary metal. Polymers can be chemically polished or etched with solvents such as methylethyl ketone, acetone, or toluene. In some embodiments, chemical polishing can be combined with mechanical polishing, for example to remove reactant by-products or to smooth a partially-solubilized polymer surface. Electropolishing can be performed on metal surfaces by disposing the metal surface to be treated as an electrode in an electrolytic cell, and electrolytically solubilizing and removing metal atoms from the surface through the electrolyte. Mechanical polishing can be performed, for example, using polishing agents dispersed in a liquid polishing composition or on a polishing tool. Heat and/or pressure treatments can be also be applied. In some embodiments, heat treatment for metals such as aluminum, copper, or stainless steel (e.g., for stress relief) can involve exposure to temperatures in a range with a lower end of 500° F., 750° F., or 1100° F., and an upper end of 1700° F., 1900° F., or 2100° F. The above lower and upper range endpoints can be independently combined to constitute a number of possible ranges, and each such possible range is hereby expressly disclosed. Pressure treatment can involve exposure of metals such as aluminum, copper, or stainless steel to isostatic pressures (e.g., gas pressure in an inert gas pressure chamber) in a range with a lower end of greater than 0 ksi or of 15 ksi, and an upper end of 30 ksi, 45 ksi, or 60 ksi. The above lower and upper range endpoints can be independently combined to constitute a number of possible ranges, and each such possible range is hereby disclosed. In some embodiments, duration of exposure to heat and/or pressure can be in the range of 1 to 20 hours.

In some embodiments, the second material can be selected to provide a targeted response to the finishing process, such as lower surface roughness, compared to the response of the first material to the finishing process. In chemical polishing, for example, the second material can be chosen to provide greater reactivity with (or solubility in) the chemical polishing agent, compared to that of the first material. In some embodiments, this can provide a technical effect of promoting easy removal of the second material to reduce surface roughness while avoiding pitting of the more robust underlying first material. A specific example of this would be a copper alloy as the second material and a steel alloy as the first material that is subjected to a nitric acid etching bath. The acid etching bath can remove virtually all of the copper except that which has penetrated the pores of the steel, leaving a chemically polished surface. In another example embodiment of a targeted response of the second material to the finishing process, the second material can be chosen to be at least as resistant to material removal from mechanical polishing, and in some embodiments more resistant to material removal from mechanical polishing, compared to the first material. In some embodiments, the second material or metal alloy has a greater hardness or wear resistance than the first material. In some embodiments, this can provide a technical effect of promoting uniform removal of the second material while reducing protrusions of the underlying softer second material that are readily removed during mechanical polishing.

Figures 2A, 2B:
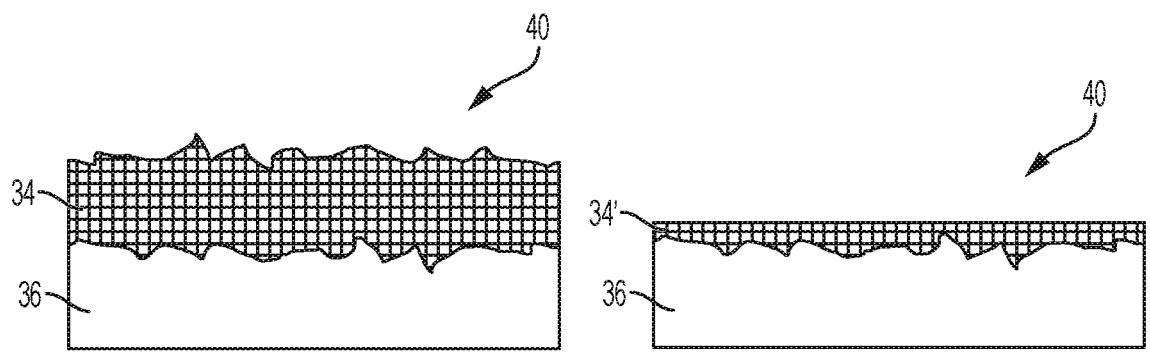
FIGS. 2A and 2B schematically show a cross-sectional view of a portion of a solid surface processed according to example embodiments described herein.
Figure 3B:
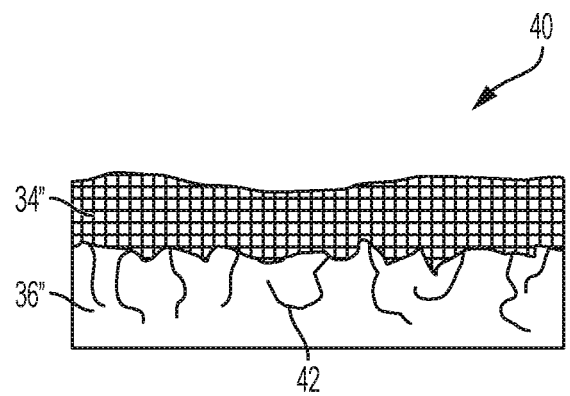
FIGS. 3A and 3B schematically show a cross-sectional view of a portion of a solid surface processed according to example embodiments described herein.
Figure 3A:
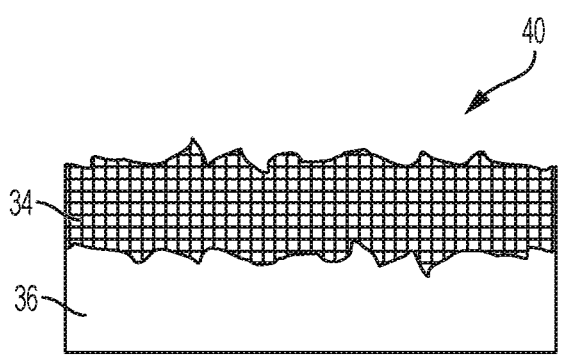

With reference again to the Figures, FIGS. 2A/2B and 3A/3B are schematic representations of a cross-sectional view of a surface portion 40 with first material 34 and second material 36. FIGS. 2A and 2B schematically show the results of a polishing surface treatment such as chemical polishing, electropolishing, or mechanical polishing. FIG. 2A shows the surface portion 40 after removal laser powder deposition of the first and second materials 34/36. FIG. 2B shows the surface portion 40 where the second material (designated as 34') has been subjected to polishing with accompanying removal of material and smoothing of the surface. FIGS. 3A and 3B schematically show the results of a heat and isostatic pressure treatment. As shown in FIG. 3B, the heat and pressure treatment promotes densification of the first and second materials 36" and 34" and accompanying smoothing of the surface, and also promotes penetration of the second material (schematically represented by tendrils 42) into the region of the first material 36". In some embodiments, the presence of the second material 36 co-deposited with the first material 34 can promote pore sealing and healing of the laser-fused first material. In some embodiments, this can allow for milder heating and pressure conditions compared to conventional hot isostatic pressing processing of additively manufactured materials. In some embodiments, any of the above finishing processes can be combined. For example, a surface can be subjected to a polishing process after being subjected to heat and pressure processing.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making an article, comprising:
    directing an energy beam to a build location on a substrate;
    delivering a first powder material, which exits from a first nozzle, and comprise a thermoplastic polymer, a fusible metal, or a combination thereof, to the build location on the substrate and melting it with the energy beam;
    delivering a second powder material, different from the first powder material, which exits from a second nozzle distinct from the first nozzle, and comprise a thermoplastic polymer, a fusible metal, or a combination thereof, to the build location on the substrate over the first powder material and melting it with the energy beam;
    repeating the directing of the energy beam and delivery and melting of the first and second powder materials to multiple build locations on the substrate to form a solid surface of the article comprising the second material; and
    subjecting the solid surface comprising the second material to a finishing process,
    wherein the finishing process comprises chemical polishing of the solid surface comprising the second material,
    wherein the second material provides a targeted response to the finishing process, compared to the first material, and
    wherein the method uses only one energy beam.

2. The method of claim 1, further comprising simultaneously delivering the first and second powder materials to the build location.

3. The method of claim 1, further comprising scanning the laser beam in a scan direction across the substrate, delivering the first powder material through a first nozzle toward a leading side of the energy beam with respect to the scan direction, and delivering the second powder material through a second nozzle toward a trailing side of the energy beam with respect to the scan direction.

4. The method of claim 1, further comprising delivering the first and second powder materials to the build location in staggered or overlapping pulses.

5. The method of claim 1, wherein the first and second powder materials each independently comprises a metal or metal alloys.

6. The method of claim 1, wherein the second material provides lower surface roughness in response to the finishing process, compared to the first material.

7. The method of claim 1, further comprising:
    inputting a digital model of the article into an additive manufacturing apparatus or system comprising an emitter for the energy beam and first and second powder delivery nozzles disposed proximate to the emitter;
    forming the article by repeatedly applying energy from the energy beam to fuse successively applied incremental quantities of the first and second powder materials.

8. The method of claim 6, wherein the first and second materials are applied to produce a polishable surface including a surface of the second material interrupted by protrusions of the first material.

* * * * *